United States Patent [19]

Arnold, Jr. et al.

[11] 4,228,384
[45] Oct. 14, 1980

[54] BRUSHLESS DC PRINTED MOTOR

[75] Inventors: Frank Arnold, Jr., Locust Valley; Dana F. Geiger, Great Neck, both of N.Y.

[73] Assignee: Kollmorgen Technologies Corporation, Dallas, Tex.

[21] Appl. No.: 903,677

[22] Filed: May 8, 1978

[51] Int. Cl.³ .............................................. H02K 29/00
[52] U.S. Cl. .................................... 318/254; 318/138; 310/268
[58] Field of Search ............... 318/138, 254, 480, 313; 310/268, 163; 83/50

[56] References Cited

U.S. PATENT DOCUMENTS

| | | | |
|---|---|---|---|
| 3,480,815 | 11/1969 | Knapp | 310/268 |
| 3,566,727 | 3/1971 | Weiss et al. | 83/50 |
| 3,706,924 | 12/1972 | Adler | 318/254 |
| 3,845,339 | 10/1974 | Merkle et al. | 318/254 |
| 3,946,292 | 3/1976 | Tanikoshi | 318/254 A |
| 4,005,347 | 1/1977 | Erdman | 318/138 |
| 4,039,912 | 8/1977 | Wada | 318/254 A |

Primary Examiner—J. V. Truhe
Assistant Examiner—John W. Redman
Attorney, Agent, or Firm—Morgan, Finnegan, Pine, Foley & Lee

[57] ABSTRACT

A bidirectional, axial air gap, brushless, printed circuit DC motor having a stationary, low inductance armature bonded to the motor frame and having a plurality of rotating permanent magnets. Electro-optical sensing is employed which produces a unique digital representation of the magnet position. The digital output of the electro-optical sensor is decoded and, using brush substitution techniques, is used to selectively and progressively energize fields in the armature winding ahead of the rotating magnets. Both single field per pole and multiple field per pole commutation techniques are taught. The armature may be cut so as to produce several independent coils which may be combined in various ways, depending on the application.

11 Claims, 18 Drawing Figures

BRUSHLESS DC PRINTED MOTOR

BACKGROUND AND BRIEF DESCRIPTION OF THE INVENTION

The present invention relates to "printed circuit" DC motors and more particularly to axial air gap brushless printed circuit DC motors.

Printed circuit DC motors as such are known. See, e.g., Swiggett U.S. Pat. No. 2,970,238. Brushless DC motors, as such, are also known. See, e.g., Ban U.S. Pat. No. 4,072,881 and Muller et al. U.S. Pat. No. 4,007,390.

As used herein the phrase "printed circuit" DC motor means a permanent magnet DC motor employing a low inductance armature formed, for example, by printed circuit techniques, by stamping or by winding. Baudot U.S. Pat. No. 3,144,574 discloses a low inductance armature formed by printed circuit techniques. Weiss et al. U.S. Pat. No. 3,566,727 discloses a low inductance armature formed from stampings. Keogh U.S. Pat. No. 3,550,645 discloses a low inductance wire wound armature.

In the present invention a flat, ironless, low inductance armature is bonded to the motor housing. The permanent magnets rotate with the rotor. In lieu of brushes the patented motor employs electronic commutation. Electro-optical sensors generate a digital representation of rotor position. The digital representation is decoded and, using brush substitution techniques, is used to selectively and progressively energize fields in the armature winding. All of this is accomplished while maintaining the high starting torque and variable speed capability of conventional DC motors.

The motor disclosed herein possesses many advantages. For example, it combines both high RPMs, e.g., on the order of 25,000, plus high horsepower, e.g., from ¼ horsepower up to 5 or even 10 horsepower. Another advantage of the invention is increased thermal capacity resulting from bonding the armature to the motor mass.

Applications for the motor include the textile field, e.g., fiber drawing and sizing. There the requirements are for a motor which generates substantial horsepower at high speed and is designed to be continuously running. In this type of application synchronous reluctance motors have previously been employed. The synchronous reluctance motors, however, are sized for 1.5 horsepower in order to get up to speed quickly even though at steady state one ½ to ¾ horsepower was needed. The DC brushless motor of the present invention has much better starting characteristics than the prior art synchronous reluctance motors.

In a DC brushless motor the position of the rotor magnets must be known at all times. In one embodiment of the present invention, which employs eight poles, three optical sensors are used to uniquely determine the positions of the magnets. The three optical sensors are employed in conjunction with an opaque disc having it circumference notched every forty-five degrees so as to generate a 3-bit gray code, i.e., one in which only one bit changes at any one time. This absolute coding permits the motor to be rotated in either direction when it is first energized. Other types of sensors, such as variable reluctance sensors may also be employed, so long as they provide absolute positioning information.

In the eight pole embodiment, switching occurs six times per quadrant or 24 times per revolution. At 25,000 RPM and switching 24 times per revolution, the switching frequency is 10 K Hertz. This high switching frequency is made possible by the low inductance of the armature.

In the eight pole embodiment, commutation may be effected by fields 45° in width. Alternatively, the 45° field may be broken into three 15° fields. This reduces the torque ripple as a function of rotor angle to 5% or less.

The armature may be cut so as to produce several independent coils which may be reconnected as desired. In one configuration, this has the effect of doubling the $K_T$ of the motor while at the same time reducing the number of semiconductor switches by one-half.

DETAILED DESCRIPTION

Figure 1:
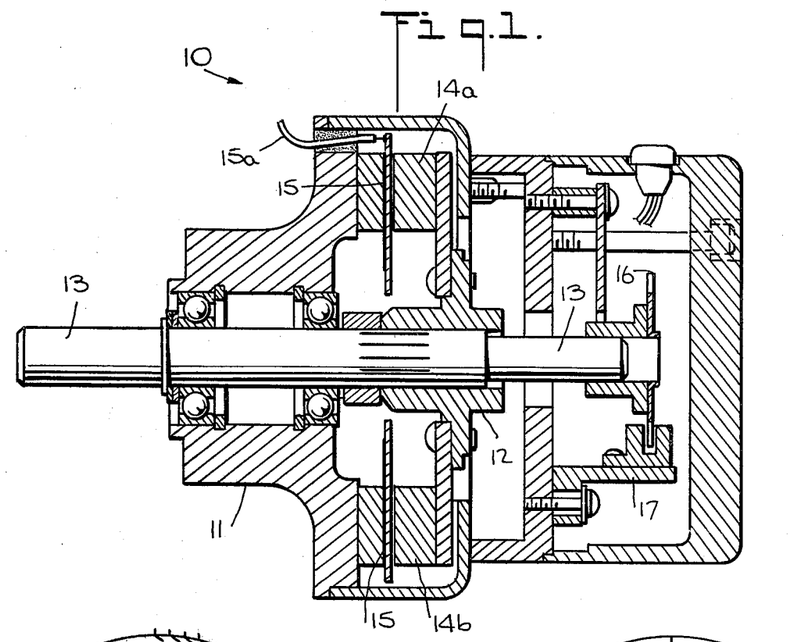
FIG. 1 is a view in section of a brushless DC printed motor in accordance with the present invention.

Referring now to FIG. 1 there is shown an eight pole brushless printed circuit motor 10 having a stator 11, a rotor 12 and a shaft 13. Permanent magnets 14a and 14b are affixed to rotor 12. Mounted on stator 11 and bonded thereto is a low inductance armature 15. Armature 15 is energized by wires 15a connected thereto. Armature 15 is spaced from magnets 14a and 14b so as to form air gaps therebetween.

Also mounted on shaft 13 is a code wheel 16 having its circumference notched every 45°, each notch extending for 45°. Mounted proximate to code wheel 16 is an electro-optical sensor 17 comprising, for example, a light emitting diode (LED) and a photodetector.

Figure 2:
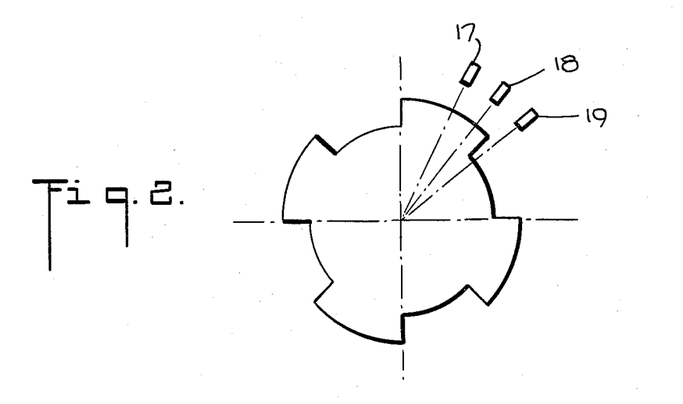
FIG. 2 is a plan view of the code wheel and position sensors for the motor of FIG. 1.

Referring now to FIG. 2, there are shown with code wheel 16 electro-optical sensors 17, 18 and 19 spaced 15° apart from each other. This combination of code wheel and sensors generates a unique digital code representative of the rotor (and therefore magnet) position.

Figure 3:
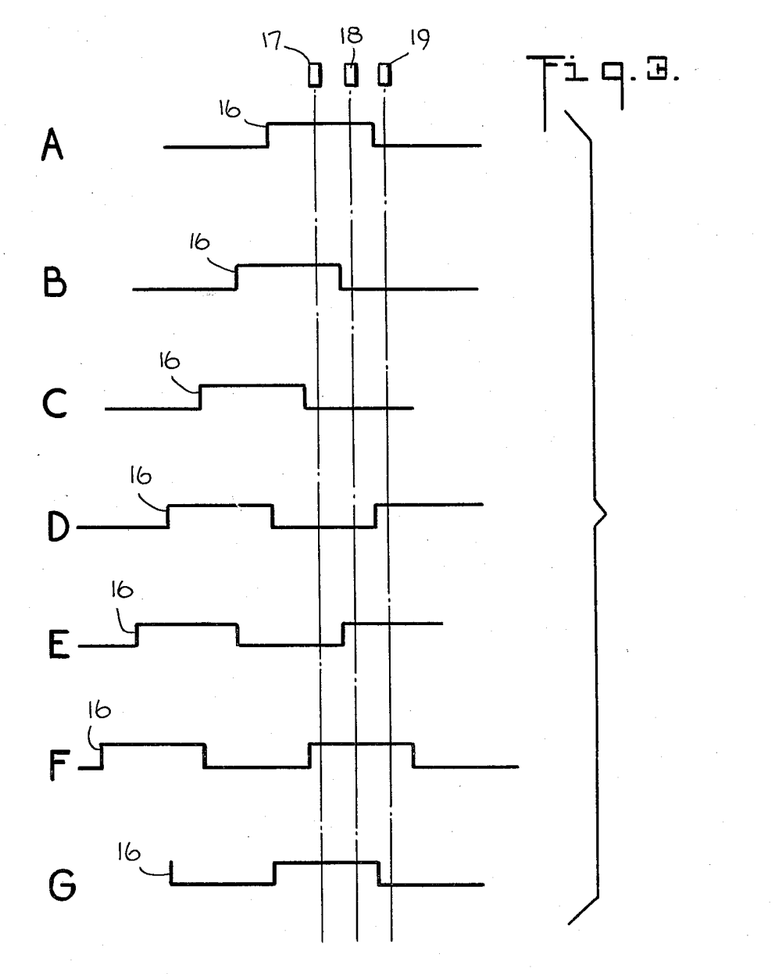
FIG. 3 illustrates diagrammatically how the code wheel and position sensors of FIG. 2 generate the position code.

FIG. 3 shows diagrammatically how this code is generated as code wheel 16 rotates past sensors 17, 18, 19. The result is set forth in the following table.

| POSTION | SENSOR | | |
|---|---|---|---|
| | 17 | 18 | 19 |
| A | 1 | 1 | 0 |
| B | 1 | 0 | 0 |
| C | 0 | 0 | 0 |
| D | 0 | 0 | 1 |
| E | 0 | 1 | 1 |
| F | 1 | 1 | 1 |
| G | 1 | 1 | 0 |

The position code generated is a gray code, i.e., a code in which only one bit changes at each change of state. This ensures there will be no ambiguities when states change.

Figures 4A, 4B, 5:
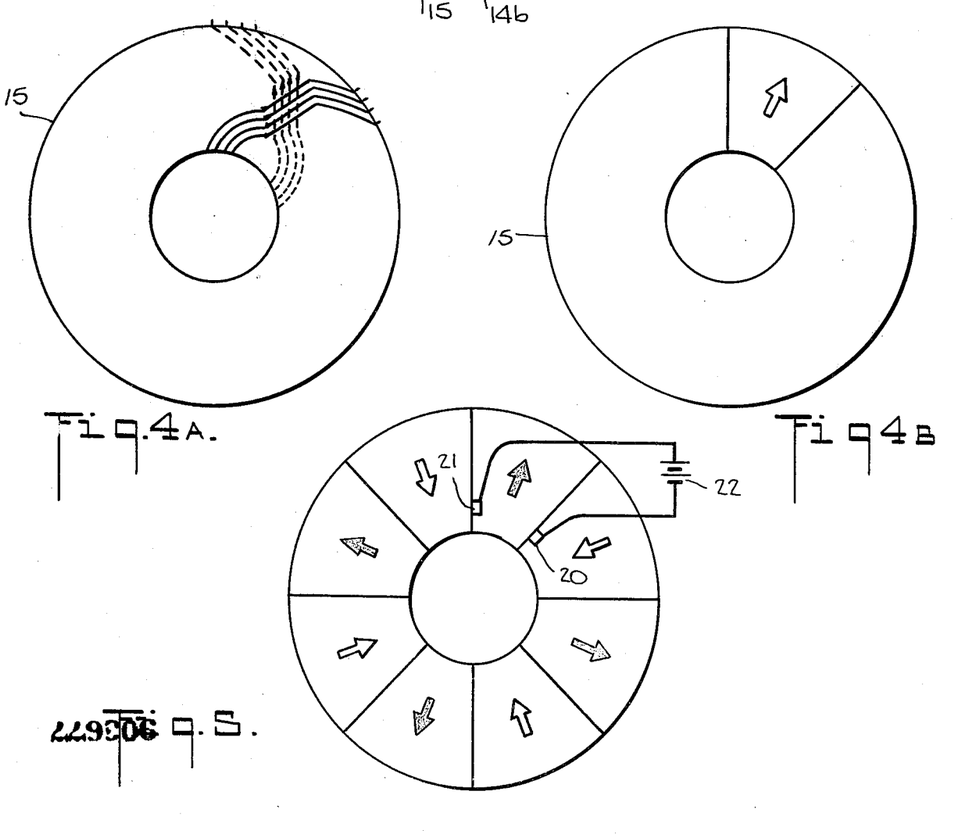
FIG. 4A is a plan view of a printed armature showing individual current conductors.
FIG. 4B is an idealized plan view of a printed armature showing a current sheet.
FIG. 5 is an idealized plan view of a printed armature showing current sheets resulting from brush excitation.

Turning now to the low inductance armature, FIG. 4A depicts a printed armature 15 showing individual current carrying conductors. Current is shown flowing on both sides of armature 15. For purposes of simplifying the explanation of the present invention, the individual current carrying conductors of the armature can be thought of as consituting a "current sheet". An idealized view of a printed armature 15 with a current sheet is shown in FIG. 4B.

In FIG. 5 is shown a printed armature 15 energized via brushes 20 and 21 from a source of DC power symbolized by battery 22. This configuration shows the armature as it would be employed in a conventional eight pole DC printed motor. Brushes 20 and 21 are 45° apart, producing a current sheet 45° wide.

Figure 6A:
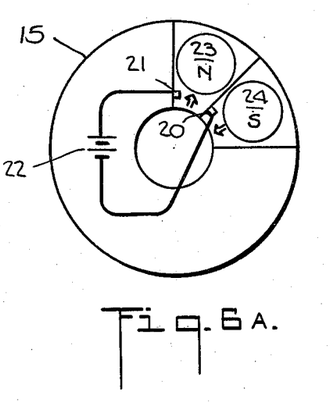
FIGS. 6A and 6B are two successive idealized plan views of printed armatures and rotor magnets.
Figure 6B:
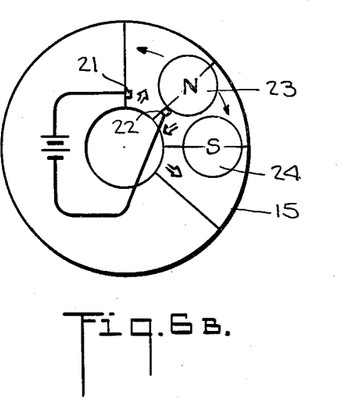

In a brushless DC motor, however, the armature is stationary and the magnets move. If current were injected into the printed armature at the brush locations shown in FIG. 6A and the magnets 23 and 24 started out in the position shown in FIG. 6A, then the magnets would stop when they reached the position shown in FIG. 6B. The magnets stop because each half of each magnet lies in a region of opposite current direction. The torque generated by the "upper half" of magnet 23 generates counter clockwise torque while the "lower" half of magnet 23 generates clockwise torque. Similarly, for magnet 24, there is a zero net torque. Therefore, some means of changing the position of the field before the magnets reach the position shown in FIG. 6B is required.

This is accomplished by soldering wires along the brush track of the armature. As the magnet moves, different pairs of wires are energized to create the correct current sheet for a given magnet position. Ideally, it would be nice to energize each and every possible pair of connections, corresponding to all possible brush positions on the armature. For economic reasons, this is not feasible, particularly in view of the fact that each pair of terminals must be energized in a bidirectional manner. That is, both outward flowing and inward flowing current sheets must be produced for a given field position, corresponding to whether a north or a south pole magnet lies over the current sheet.

A minimum of two field positions per magnet is required to produce a motor. Three field positions are preferred, because this results in minimal torque ripple. More than three field positions per magnet can, of course, be used.

Figure 7:
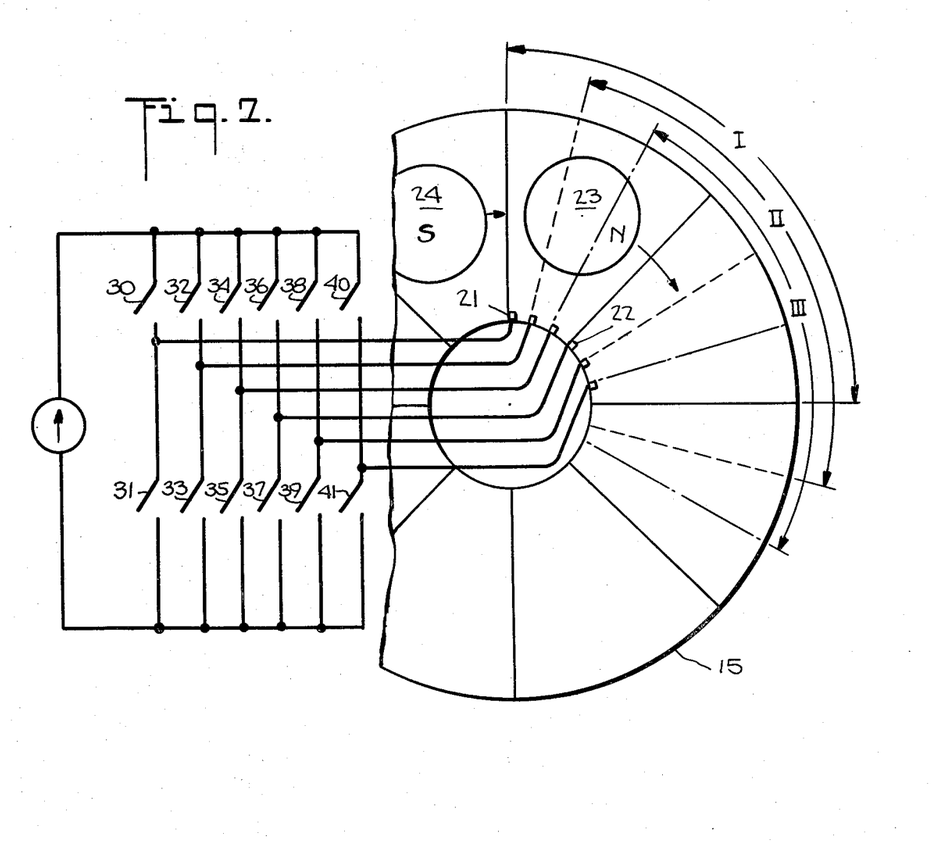
FIG. 7 is a simplified schematic of a printed armature together with its energizing circuitry.

An armature with three field positions is shown in FIG. 7. Note that twelve switches, 30 through 41, are required to realize three fields. These switches prefererably are transistors or SCR's. Each field position is driven such that the current sheet "points outward" (as for switches 30–31) or "inward" (as for 36–37) corresponding to either a north pole, or a south pole, over the current sheet. (There are three field positions and two directions for each position). For two field positions per magnet, only six switches are required. For four field positions per magnet, eighteen switches are required.

In the preferred embodiment there are eight poles (magnets), each magnet embracing a 45° sector. There are three fields per magnet, each field being 15°. Therefore, it is necessary to have six distinct and equidistant states per quadrant. Six states are needed because both field position (three) and directions (two; inward or outward) are required bits of information. This is why three sensors, located 15° apart, were chosen for use with the code wheel. That combination produces six distinct three-bit digital numbers per quadrant.

Initially switches 30 and 37 are closed. After the magnets 23 and 24 rotate 15°, switches 30 and 37 are opened and switches 32 and 39 are closed. After an additional 15° of rotation, switches 32 and 39 are opened and switches 34 and 41 are closed.

The type of commutation employed herein can be characterized as "brush substitution" or "brush mimicking" since the electronic switches merely imitate the action of the brushes, although with fewer commutations per revolution. See, e.g., FIG. 10.

The preferred armature of the present invention is a four layer armature. Two layer armatures may also be used. Both two and four layer armatures and their method of manufacture are described in U.S. Pat. No. 3,566,727 entitled "Method and Apparatus for Electric Motor Armatures". That portion of U.S. Pat. No. 3,566,727 which described the two and four layer armatures and their method of manufacture is incorporated herein by reference and the drawings and descriptions are made a part of this application as though expressly set forth herein.

Figures 8, 11A, 11B, 11C, 11D:
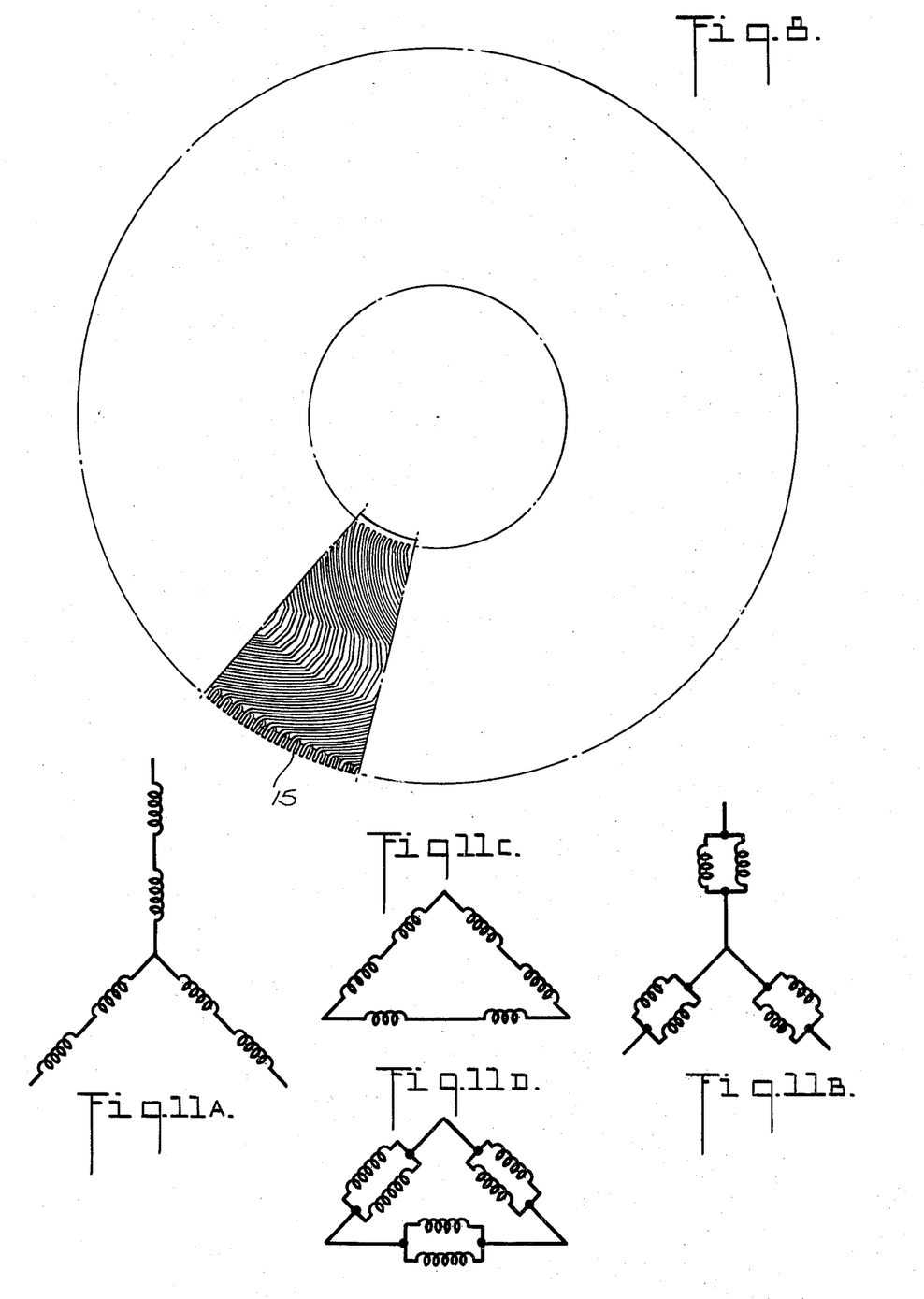
FIG. 8 is a plan view of a portion of a four layer armature for the motor of FIG. 1.
FIGS. 11A through 11D show various ways in which armature coils can be connected.

FIG. 8 shows a portion of the preferred four layer armature 15. The inner and outer welds where the conductors are joined can be clearly seen. In addition, FIG. 4C of U.S. Pat. No. 3,566,727, which is part of the material incorporated herein by reference, shows in even greater detail the manner in which the individual conductors are welded together to form a four layer armature.

FIG. 4C of U.S. Pat. No. 3,566,727 has been reproduced as FIG. 12 herein. FIG. 4C of U.S. Pat. No. 3,566,727 is described at column 5, lines 57 to 70 of U.S. Pat. No. 3,566,727 as follows.

Figure 12:
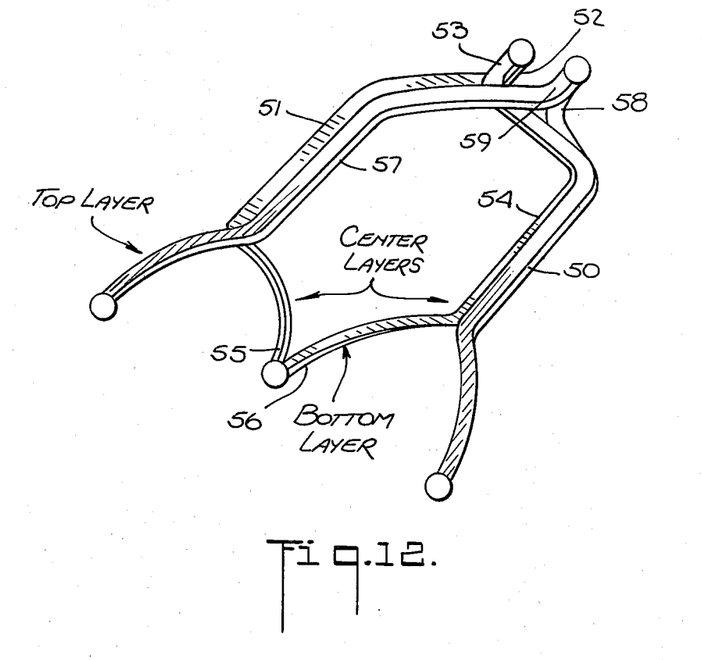
FIG. 12 is FIG. 4C reproduced from Weiss et al U.S. Pat. No. 3,566,727.

The interconnections of the conductor segment of the completed four-layer armature are illustrated in FIG. 4C. A wave segment 50 in the upper center layer is connected to a lap segment 51 in the lower center layer by means of the interconnection via outer tabs 52 and 53. The center portions of these conductor segments are spaced in accordance with the distance between pole centers and provide one armature coil.

Conductor segment 51 is in turn connected to a lap segment 54 in the bottom layer via the interconnection of inner tabs 55 and 56 and this lap segment in turn is connected to a wave segment 57 in the top layer via outer tabs 58 and 59 thereby forming a second armature coil. The remaining segments in the four layers are interconnected in similar fashion to provide a continuous closed armature winding.

The manner in which commutation is effected in the brushless printed circuit DC motor will be explained in connection with a motor having five field positions per magnet. This requires ten discrete states per magnet (five positions; two current directions per position).

Figure 9A:
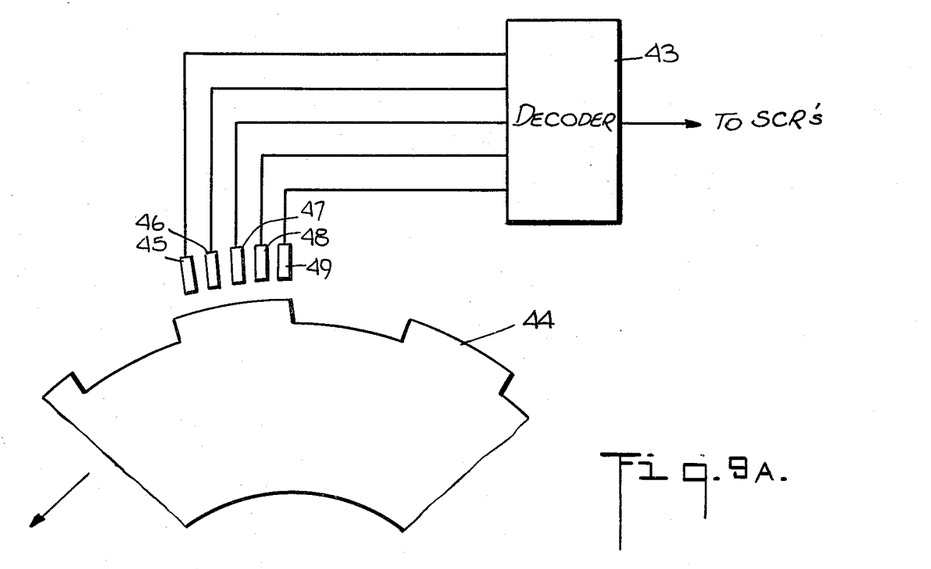
FIG. 9A is a plan view of a second code wheel and position sensors for the motor of FIG. 1.
Figure 9B:
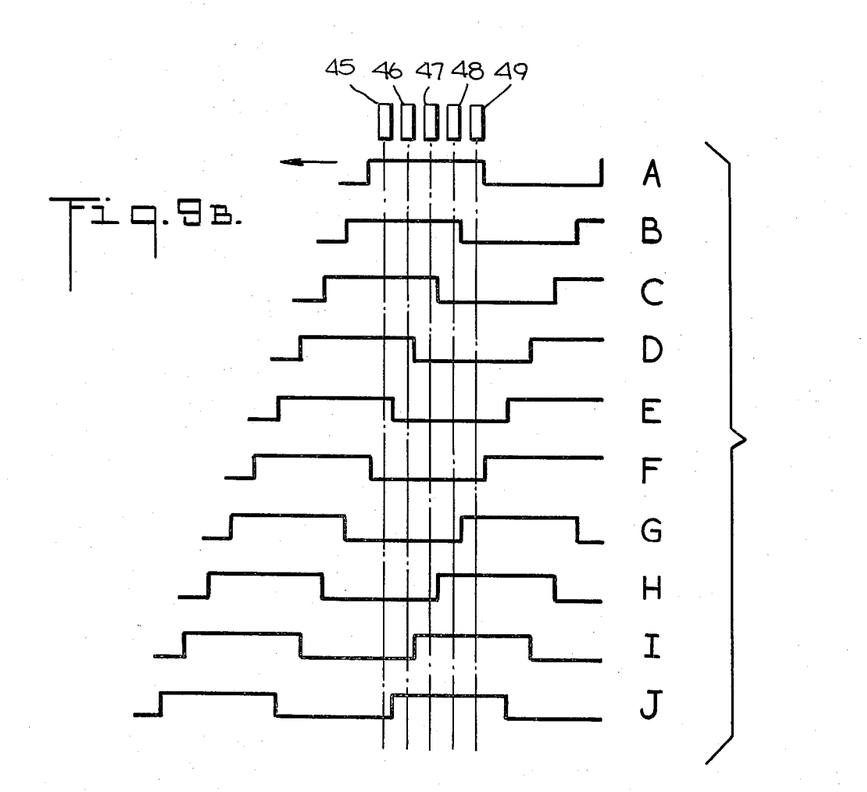
FIG. 9B illustrates diagrammatically how the code wheel and position sensors of FIG. 9A generate the position code.

FIG. 9A shows the code wheel 44 and the five sensors 45 through 49 required to generate the ten discrete states. FIG. 9B shows diagrammatically how the rotation of code wheel 44 past sensors 45 through 49 produces the following position code.

| POSITION | SENSOR | | | | |
|---|---|---|---|---|---|
| | 45 | 46 | 47 | 48 | 49 |
| A | 1 | 1 | 1 | 1 | 1 |
| B | 1 | 1 | 1 | 1 | 0 |
| C | 1 | 1 | 1 | 0 | 0 |
| D | 1 | 1 | 0 | 0 | 0 |
| E | 1 | 0 | 0 | 0 | 0 |
| F | 0 | 0 | 0 | 0 | 0 |
| G | 0 | 0 | 0 | 0 | 1 |
| H | 0 | 0 | 0 | 1 | 1 |
| I | 0 | 0 | 1 | 1 | 1 |
| J | 0 | 1 | 1 | 1 | 1 |

Figure 10:
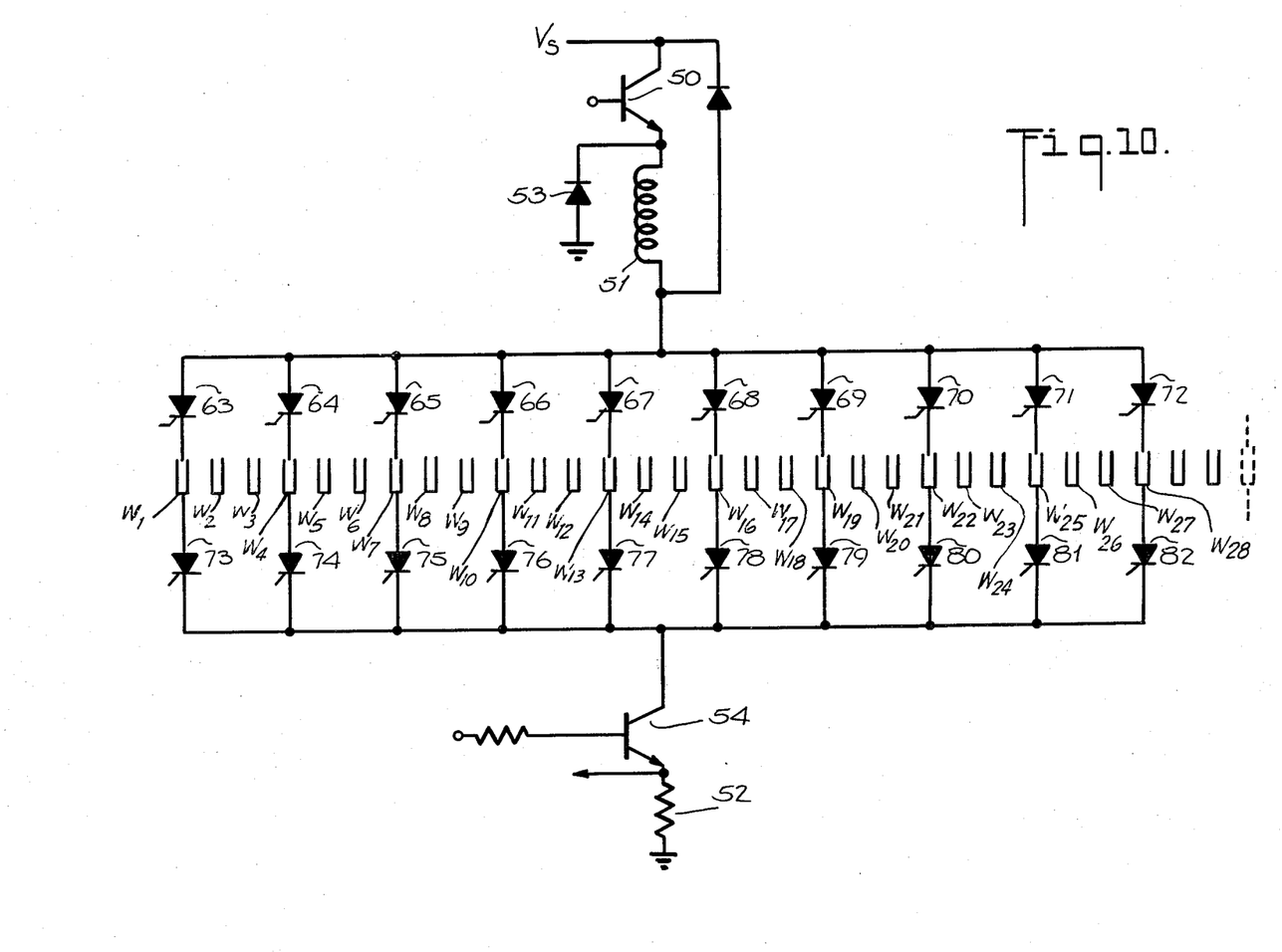
FIG. 10 is a simplified schematic diagram of the drive circuitry to be used with the code wheel and position sensors of FIG. 9A.

The circuitry used in conjunction with the brushless printed circuit DC motor consists, in general, of a set of commutating elements, a pulse width modulation (PWM) current source and auxiliary logic to decode the data which indicate magnet position. FIG. 10 is a simplified schematic diagram of the drive circuitry for the motor having five field positions per magnet.

Transistor 50 is a switching transistor driven by a pulse width modulated waveform having a frequency of about 5 K Hertz. When transistor 50 is turned on, the supply voltage $V_s$ appears on the "top" of inductor 51. When transistor 50 is turned off, inductor 51 is disconnected from the supply voltage. By controlling the ratio of on time to off time, the effective voltage input to the circuit is controlled. This is often called pulse width modulation (PWM). Since the current through inductor 51 cannot change instantaneously, inductor 51 smooths the waveform, thereby providing almost pure DC to the motor. Resistor 52 is a current sensing resistor. Note that during the off time of transistor 50, diode 53 allows current to continue to flow through inductor 51 and into the load.

SCR's 63 through 82 are connected to the inner diameter weld tips $W_1$ through $W_{28}$ (FIG. 10) of the motor armature 15 (FIG. 8). By energizing them two at a time, in sequence, the action of the brushes of a DC motor can be electronically imitated. For example, a standard motor with brushes would have one brush on the first weld tip and another brush on the sixteenth weld tip, thereby delivering power to the motor. By energizing SCR's 63 to 78, the motor will move as if brushes were placed on those weld tips. For rotation in the reverse direction, SCR's 68 and 73 can be used instead.

Once an SCR is turned on, it may be turned off only by reducing the current through it to a value less than the holding current. Transistor 54 is the commutation transistor that performs this function. Transistor 54 is operated as normally on (fully saturated). When it is desired to turn off a given set of SCR's, transistor 54 is turned off. This reduces the current through the SCR's to the leakage current of transistor 54, which is much less than the holding current of the SCR's. During the commutation interval when transistor 54 is off, the current in inductor 51 flows back into the supply via diode 53. In this manner, SCR's can be turned on or off as desired.

To summarize: transistor 50 alternately connects and disconnects the supply voltage to inductor 51. The magnitude of the current in inductor 51 is controlled by varying the ratio of on to off time of transistor 50. when transistor 50 is off, current flows through diode 53. When transistor 50 is on, current flows back to the supply via diode 53. Transistor 54 commutates the SCR's, thereby turning them on and off as desired.

The brushes of a conventional DC motor make contact with all of the conductors in the armature. In this particular embodiment of the brushless DC motor of the present invention, only every third conductor is utilized. It can be shown from the geometry of the armature windings and magnet diameters that the use of every third conductor produces no ill effect, i.e., "clipping". Clipping is the phenomenon wherein a retarding torque is produced by incorrect current direction in the armature.

As brought out earlier, the sets of SCR's are turned on and off as a function of the position of the rotating magnets. For this purpose, an absolute encoder such as the one shown in FIGS. 9A and 9B is required to supply this position information to the electronics. In general, the sequence of turning on the SCR's is 63 and 78, 64 and 79, 65 and 80, 66 and 81, 67 and 82, 68 and 73, 69 and 74, 70 and 75, 71 and 76, and 72 and 77. With this sequence a pole pair (north and south) is properly driven across the face of the armature. The absolute encoder for this motor encodes ten distinct equal duration positions. It also produces a gray code, i.e., one in which only one bit changes at a time.

The encoder output, i.e., the output of sensors 45 through 49 are fed to decoder 43 (FIG. 9A) which decodes the magnet position data. The outputs of decoder 45 go to the various SCR's 63 through 82. Decoder 43 may comprise, for example, a ten five-input AND gates.

While the commutation for the brushless DC printed motor of the present invention has been described in detail for the case where five fields per magnet are employed, the operation for the case where three fields per magnet are used is in principle the same. The only differences are that only three sensors are required (FIGS. 2 and 3) and only six pairs of SCR's are employed instead of the ten shown in FIG. 10. As brought out earlier, any number of fields per magnet greater than two may be used, the particular number being a matter of choice depending on the particular application.

In order to make a higher horsepower brushless printed circuit DC motor using a four layer armature, applicants conceived of the idea of putting two armatures in series. This, it was thought, would double the $K_T$, double the $K_E$, reduce axial thrust to zero, reduce audible noise, all while retaining the same number of switches. However, it was found that it was not possible to put two brushless armatures in series, without employing substantially more switches. Although armatures could be used in parallel, $K_T$ and $K_E$ would be halved, and excessive amounts of current would be required to run even a fairly small motor. Applicants then conceived of the idea of cutting the four layer armature in six places so as to omit the Y connection in the second armature. Each of the coils in the second armature is then independent and is connected in series with the correct coil on the first armature. This is shown in FIG. 11A. This series Y connection has the advantage of doubling the $K_T$ and $K_E$ of a single armature. When two armatures are used in series, $K_T$ AND $K_E$ are quadrupled. A third advantage is that only six switches are required for three field positions, as compared to twelve switches for the uncut armature.

For a two layer armature, the method of cutting is to count the number of weld tips in a 90° segment of arc, divide this number by six, and cut at those points. For example, if there are thirty weld tips in a 90° segment, every fifth weld is cut apart until there are six pairs of cut weld tips. These then form six independent coils. For a four layer armature, an analogous procedure applies except that the number of weld tips is double, and some care must be taken to make sure a totally new coil is begun at each cut. (The four layers armature winds back on itself every second weld tip, and the coil that winds back on itself must be allowed to do so and not be cut prematurely.) If there are an uneven number of weld tips, then one coil should be allowed to have one additional turn.

FIGS. 11A through 11D show how the six coils may be connected together in pairs to form various combinations. FIG. 11A shows a series Y connection, FIG. 11B a parallel Y connection, FIG. 11C a series Δ connection and FIG. 11D a parallel Δ connection. These coil configurations result in different motor properties. An experimental comparison between the series Y of FIG. 11A connection and the uncut armature was made which showed that $K_T$ almost doubled. There are advantages to each configuration depending upon the application.

The invention disclosed and claimed herein is not limited to the specific methods and mechanism shown and described since modifications will undoubtedly occur to those skilled in the art.

What we claim is:

1. A bidirectional, axial air gap, brushless, printed circuit DC motor comprising:
   (a) a rotor having a plurality of permanent magnet poles;
   (b) a stator having a flat, ironless, low inductance four layer, stamped armature with at least three fields per pole;
   (c) sensing means for sensing the position of said rotor and for producing an output signal indicative thereof;
   (d) decoder means connected to said sensing means for decoding said output signal; and
   (e) solid state commutating means connected to said armature and to said decoder for successively energizing said fields in accordance with the position of said magnets.

2. A printed circuit motor according to claim 1 wherein said solid state commutating means switches at a frequency between on the order of five thousand and ten thousand Hertz.

3. A printed circuit motor according to claim 1 wherein said sensing means comprises electro-optical means for producing a digital signal indicative of rotor position.

4. A printed circuit motor according to claim 3 wherein said digital signal is in gray code.

5. A bidirectional, axial air gap, brushless, printed circuit DC motor comprising:
   (a) a rotor having a plurality of permanent magnet poles;
   (b) a stator having a flat, ironless, low inductance armature having at least three fields per pole;
   (c) electro-optical means for sensing the position of said rotor and for producing a digital output signal indicative thereof;
   (d) decoder means connected to said sensing means for decoding said digital output signal; and
   (e) solid state commutating means connected to said armature and to said decoder for successively energizing said fields in accordance with the position of said magnets, said solid state commutating means switching at a frequency between on the order of five thousand and ten thousand Hertz.

6. A printed circuit motor according to claim 5 wherein said low inductance armature is a stamped armature.

7. A printed circuit motor according to claims 1 or 5 wherein said armature comprises series γ connection.

8. A bidirectional, axial air gap, brushless DC motor comprising:
   (a) a rotor having a plurality of permanent magnet poles;
   (b) a stator having a flat, ironless, low inductance, stamped, series Y connected armature having at least two field per pole;
   (c) sensing means for sensing the position of said rotor and for producing an output signal indicative thereof;
   (d) decoder means connected to said sensing means for decoding said output signal; and
   (e) solid state commutating means connected to said armature and to said decoder for successively energizing said fields in accordance with the position of said magnets.

9. A printed circuit motor according to claim 8 wherein said armature is a four layer armature having three fields per pole.

10. A printed circuit motor according to claim 8 wherein said sensing means comprises electro-optical means for producing a digital signal indicative of rotor position.

11. A printed circuit motor according to claims 8, 9 or 10 wherein said solid state commutating means switches at a frequency between on the order of five thousand and ten thousand Hertz.

* * * * *